(12) United States Patent
Osswald et al.

(10) Patent No.: US 8,466,693 B2
(45) Date of Patent: Jun. 18, 2013

(54) FILL LEVEL MEASURING DEVICE

(75) Inventors: Dirk Osswald, Schopfheim (DE); Ralf Reimelt, Freiburg (DE)

(73) Assignee: Endress + Hauser GmbH + KG, Maulburg (DE)

( * ) Notice: Subject to any disclaimer, the term of this patent is extended or adjusted under 35 U.S.C. 154(b) by 237 days.

(21) Appl. No.: 13/126,586

(22) PCT Filed: Oct. 19, 2009

(86) PCT No.: PCT/EP2009/063629
§ 371 (c)(1),
(2), (4) Date: Apr. 28, 2011

(87) PCT Pub. No.: WO2010/049297
PCT Pub. Date: May 6, 2010

(65) Prior Publication Data
US 2011/0199103 A1    Aug. 18, 2011

(30) Foreign Application Priority Data
Oct. 29, 2008    (DE) .......................... 10 2008 043 252

(51) Int. Cl.
*G01R 27/26*    (2006.01)
(52) U.S. Cl.
USPC ........................................................ 324/658
(58) Field of Classification Search
USPC ......... 324/658, 762.01–762.1, 750.01–750.3, 324/637, 696; 257/48; 438/14–18; 73/866.5, 73/292, 304 C, 290 V; 361/284
See application file for complete search history.

(56) References Cited

U.S. PATENT DOCUMENTS
2,375,084 A     5/1945 Coroniti
(Continued)

FOREIGN PATENT DOCUMENTS
DE      1 623 665           7/1971
DE      195 10 484 A1   10/1996
(Continued)

OTHER PUBLICATIONS
German Search Report.
International Search Report.
English translation of the international Preliminary Report.

*Primary Examiner* — Tung X Nguyen
(74) *Attorney, Agent, or Firm* — Bacon & Thomas, PLLC

(57) ABSTRACT

A fill level measuring device for capacitive fill level measurement and/or travel time fill level measurement of a fill substance in a container. The measuring device has a coaxial measuring probe, whose inner conductor is galvanically isolated from its shield conductor, and whose shield conductor lies electrically at a reference potential. The device additionally includes: a securement apparatus lying electrically at a reference potential and serving for securement of the measuring device on a container opening equipped with a counterpart of the securement apparatus; and a washer made of an electrically conductive material and clamped in measurement operation between the securement apparatus and the counterpart. The inner conductor is completely surrounded in measurement operation by an insulating layer and passes through the washer into the container. The device additionally includes an insulating body adjoining the insulating layer and coaxially surrounding the inner conductor. The insulating body has a washer-shaped section clamped between the securement apparatus and the washer. The shield conductor coaxially surrounds the inner conductor and is connected mechanically and in an electrically conducting manner with the washer. At least one electrical contact element is affixed in the washer outside of a region of such covered by the insulating body and on a spring element. Via the contact element and the washer, the shield conductor is connected in an electrically conducting manner to the securement apparatus.

9 Claims, 2 Drawing Sheets

U.S. PATENT DOCUMENTS

| | | |
|---|---|---|
| 3,433,072 A | 3/1969 | Virtanen |
| 3,477,290 A | 11/1969 | Lerner |
| 6,118,282 A | 9/2000 | Grieger |
| 7,337,662 B2 * | 3/2008 | Sato et al. .................. 73/304 C |
| 7,814,789 B2 * | 10/2010 | Schroth ....................... 73/304 C |
| 7,959,863 B2 * | 6/2011 | Yamamoto et al. .......... 422/68.1 |
| 2003/0201842 A1 | 10/2003 | Gard |
| 2005/0285608 A1 | 12/2005 | Sato |

FOREIGN PATENT DOCUMENTS

| | | |
|---|---|---|
| DE | 197 57 924 A1 | 7/1999 |
| DE | 100 37 715 A1 | 2/2002 |
| GB | 2 059 596 A | 4/1981 |

* cited by examiner

FILL LEVEL MEASURING DEVICE

TECHNICAL FIELD

The invention relates to a fill level measuring device for measuring fill level of a fill substance located in a container, wherein the device has a completely insulated measuring probe introduced into the container.

BACKGROUND DISCUSSION

Fill level measurements of this type are applied in wide ranges of industrial measurements technology for fill level measurement of fill substances located in containers.

Two different measuring principles are known, which permit fill level to be measured by means of a measuring probe introduced into a container.

A first measuring principle is based on a travel time measurement. In such case, the fill level measuring device produces electromagnetic signals, which it transmits into the container along the measuring probe, in this case serving as a waveguide. A part of these electromagnetic signals is reflected from the surface of the fill substance, and its echo signal is received back after a travel time dependent on the fill level. The fill level measuring device determines the travel time which passes between the transmission of the signal and the receipt of the echo signal arising from the reflection off the surface of the fill substance. The determining of these travel times proceeds on the basis of known travel time measuring methods. In connection with guided electromagnetic signals, time-domain reflectometry (time domain reflection), for example, is used. In such case, a high-frequency pulse is transmitted, for example, according to the guided microwave method, along a Sommerfeld waveguide, a Goubau waveguide or a coaxial waveguide. If this electromagnetic signal strikes a surface of the fill substance in the container, at least a part of the signal is then reflected back due to the impedance jump existing at this media boundary. The received signal amplitude as a function of time represents the echo signal. Each value of this echo signal corresponds to the amplitude of an echo reflected at a particular distance from the transmitting and receiving element. The echo signals have clear maxima, which correspond to the portions of the electromagnetic signals in each case reflected off the surface of the fill substance. From the time difference between the transmission of the electromagnetic signal and the receipt of the maxima, the sought travel time is ascertained.

On the basis of the structural dimensions of the measuring arrangement—especially of the installed height of the fill level measuring device with respect to the container—and the propagation velocities of the electromagnetic signals in a medium located above of the upper fill substance, e.g. in air, there results from the travel time the fill height of the fill substance in the container, and therewith the fill level present in the container.

A second measuring principle is based on a capacitance measurement. In this case, the measuring probe serves as a capacitive probe, or as an electrode. It is inserted in the container, and the capacitance of the capacitor formed by the probe and the container wall surrounding it is measured. The measured capacitance corresponds to the sum of a basic capacitance of the empty container, the product of a fill-substance-specific capacitance increase factor of the fill substance, and the latter's fill height.

Classical fill level measuring devices for measuring fill level of a fill substance located in a container are known, in the case of which the travel time measurement principle is combined with the capacitive measuring principle in one measuring device. An example of this is the apparatus described in DE 100 37 715 A1 of the assignee for measuring fill level of a single fill substance located in a container. The apparatus includes a probe, which can be operated selectively as a capacitive probe of a classic capacitive fill level measuring device, as well as also as a waveguide of a classic fill level measuring device, working according to the travel time principle.

A further example is described in DE-A1 195 10 484. This application describes a fill level measuring device working according to the travel time principle. The device has a waveguide, and, in the waveguide, a metal inner conductor is provided, which serves as a capacitive probe.

Preferably, so-called coaxial probes are applied as measuring probes both for capacitive fill level measurement, as well as also for fill level measurement according to the travel time principle. These comprise an inner conductor and a shield conductor coaxially surrounding the inner conductor. Coaxial probes offer the advantage that the measurements performed therewith occur completely independently of the installed situation of the measuring probe in the container. Especially the shape and electrical properties of the container no longer have an influence on the measuring. At the same time, via the shield conductor, a maximum signal quality is achieved, influences from external disturbances and power losses are significantly reduced thereby.

In order to be able to apply such a coaxial probe for a capacitive fill level measurement and/or a fill level measurement according to the above described travel time principle, it is absolutely required that the inner conductor is galvanically isolated from the shield conductor. That is to say, even in the case of use in a container filled with an electrically conductive fill substance, no galvanic connection is permitted to occur between the inner conductor and the shield conductor. Such a galvanic connection would lead to a short circuit, which renders both capacitive fill level measurement as well as fill level measurement according to the travel time principle impossible.

At the same time, it must be assured that the shield conductor is electrically connected to a reference potential, preferably to ground. The reference potential forms for the capacitive fill level measurement a reference potential, with respect to which the capacitance measurement is performed. If the shield conductor were not at the reference potential, in the context of the capacitive fill level measurement, an isolated capacitance would be formed in the container by the inner conductor and the shield conductor. An isolated capacitance is not allowable, especially in applications in which special explosion protection measures must be made for safety reasons.

The shield conductor preferably lies at reference potential—preferably at ground—also in the case of fill level measurement according to the travel time principle. If this is not so, in the region of the coupling of the electromagnetic signal into the coaxial probe, impedance jumps can be present, which lead to strong input reflection of the electromagnetic signals in this region. These undesired input reflections lead to a markedly higher power loss.

SUMMARY OF THE INVENTION

It is an object of the invention is to provide a fill level measuring device having a coaxial measuring probe, in the case of which the inner conductor of the measuring probe is galvanically isolated from the shield conductor, and the shield conductor lies electrically at a reference potential.

For this purpose, the invention resides in a fill level measuring device for capacitive fill level measurement and/or for travel time fill level measurement for a fill substance in a container, wherein the fill level measuring device comprises:
- a securement apparatus lying electrically at a reference potential and serving for securing the measuring device on a container opening equipped with a counterpart of the securement apparatus,
- a washer of an electrically conductive material clamped in measurement operation between the securement apparatus and the counterpart
- an inner conductor, which is completely surrounded by an insulating layer, and which, in measurement operation, passes through the washer into the container,
- an insulating body adjoining the insulating layer and coaxially surrounding the inner conductor,
- wherein the insulating body has a washer-shaped section clamped between the securement apparatus and the washer,
- a shield conductor, which coaxially surrounds the inner conductor and is connected mechanically and in an electrically conducting manner with the washer, and
- at least one electrical contact element affixed on a spring element in the washer outside of a region of such covered by the insulating body, whereby the shield conductor is connected via the contact element and the washer to the securement apparatus in an electrically conducting manner.

In a preferred further development, the insulating body has a hollow-cylindrical section, which is surrounded terminally by the washer-shaped section clamped between the securement apparatus and the washer, and which completely fills a hollow-cylindrical hollow space between the inner conductor and the washer at its side facing the securement apparatus.

In an additional further development, the insulating body includes a section conically tapering to the outer diameter of the insulated inner conductor in a direction away from the securement apparatus.

In an additional further development, each spring element is arranged in a blind bore provided in the washer, and presses its contact element against the securement apparatus.

In a preferred embodiment, the contact elements are metal spheres, which are affixed on their spring elements.

In an additional preferred embodiment, the securement apparatus is connected to ground.

In an additional embodiment, the insulating body comprises polytetrafluoroethylene (PTFE).

In an additional further development, the shield conductor is screwed onto an electrically conductive, connection piece, which is inserted into the washer, especially fleshly screwed into the washer.

The fill level measuring device of the invention has the advantage that it is suitable both for capacitive fill level measurement as well as also for fill level measurement according to the travel time principle.

A further advantage of the fill level measuring device of the invention lies in the fact that it is applicable in a broad temperature range, since, via the spring elements, a reliable electrical connection of the shield conductor is given, even when the distance between the washer and the securement apparatus changes due to thermal expansion of the insulating body.

BRIEF DESCRIPTION OF THE DRAWINGS

The invention and its advantages will now be explained in greater detail on the basis of the figures of the drawing presenting an example of an embodiment; equal parts are provided in the figures with equal reference characters. The figures of the drawing show as follows.

DETAILED DISCUSSION IN CONJUNCTION WITH THE DRAWINGS

Figure 1:
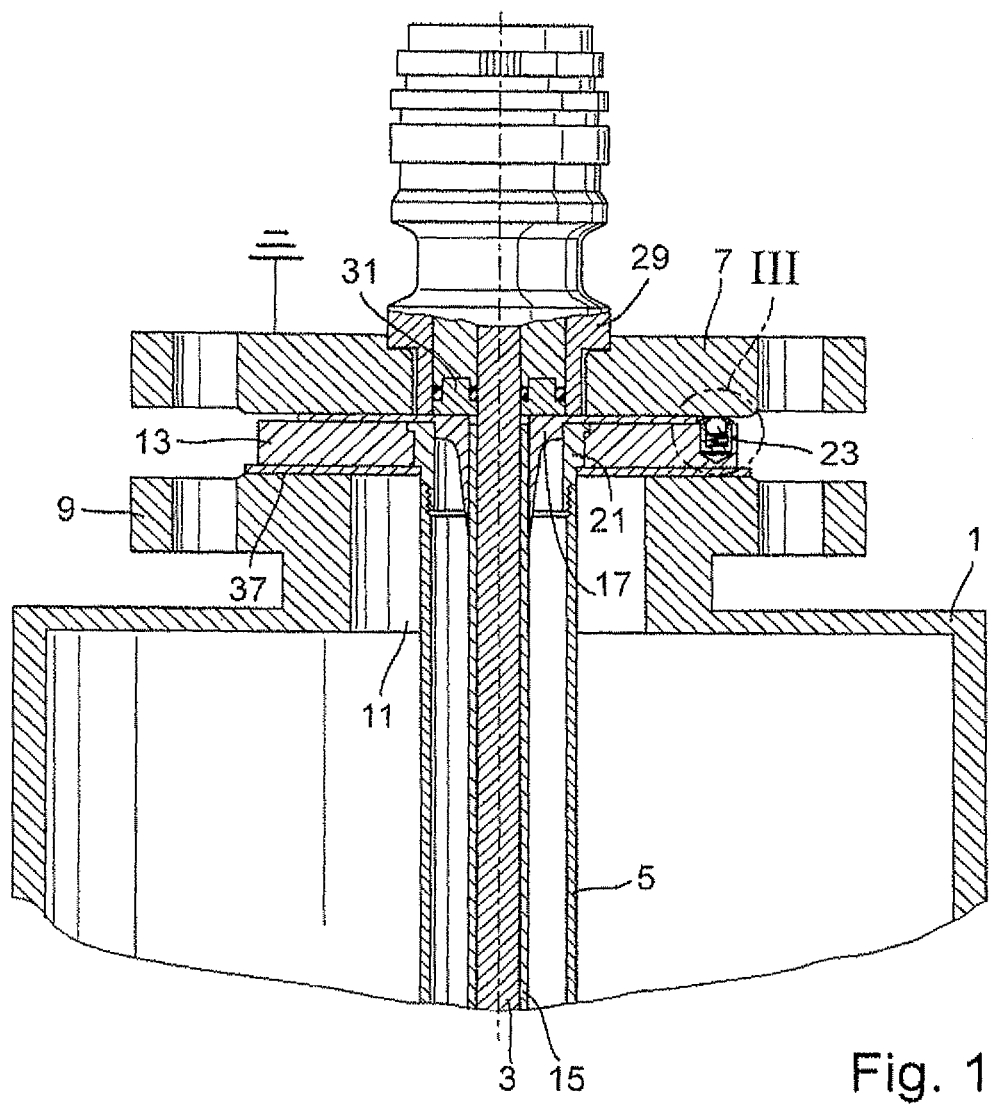
FIG. 1 is a partially sectioned view of a fill level measuring device of the invention.

FIG. 1 shows a partially sectioned view of a fill level measuring device of the invention. The fill level measuring device serves for capacitive fill level measurement and/or travel time fill level measurement of a fill substance in a container 1. To this end, the fill level measuring device comprises a coaxial measuring probe, which has an inner conductor 3 and a shield conductor 5 coaxially surrounding the inner conductor 3.

The fill level measuring device includes a securement apparatus 7, with which the measuring device is mountable on a container opening 11 equipped with a counterpart 9 of the securement apparatus 7. In the illustrated example of an embodiment, the securement apparatus 7 is a flange and the counterpart 9 is a correspondingly formed counterflange. Of course, other securement apparatuses known to those skilled in the art and their corresponding counterparts can also be applied here. In the installed state, the coaxial measuring probe extends into the container 1, and the fill substance enters into the inner space between shield conductor 5 and inner conductor 3 up to a fill height corresponding to the current fill level. In order to support the fill substance flow into the inner space and out of the inner space, the shield conductor 5 can have, arranged distributed over its length, openings, through which the fill substance can enter and leave. Alternatively or supplementally, the shield conductor 5 can have an air escape opening provided above the highest allowable fill level in the installed state.

In the case of a capacitive fill level measurement, the inner conductor 3 serves as an electrode, and the shield conductor 5 as a counterelectrode. The electrode and counterelectrode form a capacitor, whose capacitance depends on the fill height of the fill substance in the inner space between the shield conductor 5 and inner conductor 3. Fill level is, in this case, determined based on a measuring of this capacitance.

In the case of a fill level measurement according to the travel time principle, the inner conductor 3 serves as a waveguide, along which electromagnetic signals are transmitted into the container, and their echo signals, reflected off the surface of the fill substance located in the inner space surrounded by the shield conductor 5, are received again after a travel time dependent on the fill level. The associated signal travel time is measured, and, based on the signal travel time and the propagation velocity of the electromagnetic signals along the waveguide, fill level is determined. In this case, the shield conductor 5 shields against the environment and assures that measuring conditions remain the same. Alternatively, the inner conductor 3 and shield conductor 5 can together be applied as a coaxial conductor, in which the electromagnetic signals are correspondingly conveyed. The shield conductor 5 effects in both cases an impedance which is constant over the entire length of the coaxial measuring probe. In this way, a high signal quality is achieved and power loss is kept extremely small.

Figure 2:
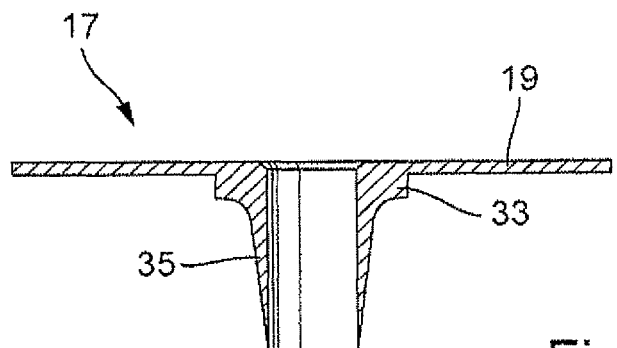
FIG. 2 is the insulating body of FIG. 1.

According to the invention, the fill level measuring device includes a washer 13, which, in the installed state, is clamped between the securement apparatus 7 and the counterpart 9, and which is made of an electrically conductive material, preferably of metal. The inner conductor 3 is completely surrounded by an insulating layer 15 and extends through the washer 13 into the container 1. Inserted in the washer 13 is an insulating body 17, which coaxially surrounds the inner conductor 3 in the washer 13, and which adjoins directly on the insulating layer 15. Insulating layer 15 and insulating body 17 are made of an insulating material, e.g. polytetrafluoroethylene (PTFE). FIG. 2 shows, in detail, an example of an embodiment of the insulating body 17. It includes on its end a washer-shaped section 19 extending radially outwards. In the installed state, section 19 is clamped between the securement apparatus 7 and the washer 13.

Shield conductor 5 is composed of an electrically conductive material, preferably metal, and is connected mechanically and in an electrically conducting manner with the likewise electrically conductive washer 13. For this, washer 13 and shield conductor 5 could be embodied as a single piece. For manufacturing reasons, it is, however, as a rule, advantageous to use two separate components which are connected with one another. In the example of an embodiment illustrated in FIG. 1, for this purpose, an essentially hollow-cylindrical, connection piece 21 made of an electrically conductive material, preferably metal, is provided, via which mechanical and electrical connection between the washer 13 and the shield conductor 5 is effected. Connection piece 21 is, for this purpose, screwed into the washer 13, and is flush with the washer 13 on the side of the latter facing the securement apparatus 7. The end of the connection piece 21 lying opposite protrudes out from the washer 13 toward the container 1, and includes a screw thread, onto which the shield conductor 5, equipped with a corresponding counterthread, is screwed. Since both the washer 13, as well as the connection piece 21 and the shield conductor 5, are composed of electrically conductive materials, this mechanical connection simultaneously also effects the desired electrical connection. The washer 13 and the connection piece 21 can naturally also be embodied as a single piece.

According to the invention, at least one contact element 23 is provided, which effects an electrically conductive connection between the securement apparatus 9 and the washer 13. The securement apparatus 9 is connected to a predetermined reference potential, preferably to ground. This is standard in industrial measurements technology. Measuring device housings, as well as their securement apparatuses, are usually grounded. Correspondingly, the electrically conducting shield conductor 5 connected with the washer 13 is likewise connected to this reference potential via the contact elements 23.

The contact elements 23 are arranged on an outer edge of the washer 13, outside of the region of such covered by the insulating body 17. In the illustrated example of an embodiment, the contact elements 23 are arranged outside of the region of the washer 13 covered by the washer-shaped section 19 of the insulating body 17. Fundamentally, a single contact element 23 is sufficient to produce the electrical contact. Preferably, however, three or more contact elements 23 are applied, which are arranged uniformly distributed around the outer edge of the washer 13. The contact elements 23 are in each case affixed on a spring element 25, which presses the respective contact element 23 against the securement apparatus 7.

Figure 3:
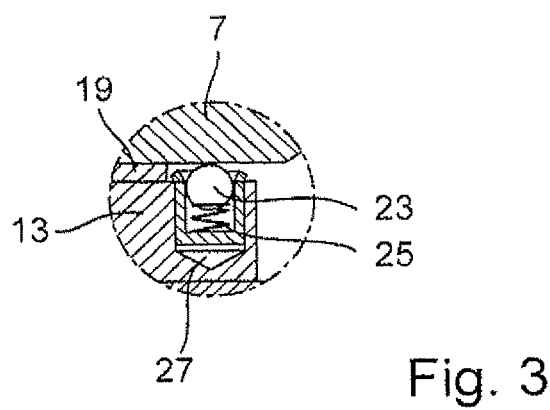
FIG. 3 is a contact element affixed on a spring element in a blind bore in the washer of FIG. 1.

For this, the spring elements 25 are—as presented in detail in FIG. 3—placed in blind bores 27 provided in the washer 13 for accommodating the spring elements 25. The contact elements 23 are, in the illustrated example of an embodiment, metal spheres, which are affixed on the spring elements 25.

The use of the spring elements 25 has the advantage that a reliable electrical contact is also assured when the fill level measuring device is exposed to changing environmental temperatures. Alternating environmental temperatures result in fluctuations in the thickness of the circular washer-shaped section 19 of the insulating body 17 clamped between the securement apparatus 7 and the washer 13; these fluctuations are absorbed via the spring elements 25. The spring elements 25 therewith assure reliable electrical contact, via which the shield conductor 5 is connected in an electrically conducting manner to the securement apparatus 7 via the washer 13 and the contact elements 23.

At the same time, via the insulating body 17, together with the insulating layer 15 surrounding the inner conductor 3, a reliable isolation of the inner conductor 3 is given, via which the inner conductor 3 is completely galvanically isolated from the components connected to the reference potential: The shield conductor 5, washer 13, connection piece 21 and securement apparatus 7. This insulation is continued in the connection piece 29 of the measuring device adjoining the coaxial measuring probe via corresponding additional insulators 31 applied there.

Preferably, the insulating body 17 includes a hollow cylindrical section 33, which is surrounded terminally by the washer-shaped section 19 clamped between the securement apparatus 7 and the washer 13, and which completely fills a hollow-cylindrical hollow space between the inner conductor 3 and the washer 13 at the side of the washer facing the securement apparatus 7. This section 33 effects, in addition to the insulating, a precisely fitting centering and an additional mechanical affixing of the insulating body 17 in the washer 13. If the connection piece 21 shown in FIG. 1 is inserted into the washer 13, this section 33 then naturally completely fills out at its ends the corresponding hollow-cylindrical hollow space between the inner conductor 3 and the connection piece 21 on their side facing the securement apparatus 7.

Preferably, the insulating body 17 includes a section 35, which conically tapers to the outer diameter of the insulated inner conductor 3 in the direction facing away from the securement apparatus 7, and whose greatest diameter is preferably equal to an inner diameter of the washer 13, of the connection piece 21, or of the shield conductor 5. This conical section 35 offers, on the one hand, the advantage that fill substance entering in this region can more easily drain downwards into the container 1. On the other hand, with respect to fill level measurement according to the travel time principle, it offers a continuous transfer for the electromagnetic signals, in that the impedance along the coaxial measuring probe in this introduction region changes only slowly and, above all, continuously and non-abruptly.

Between the washer 13 and the counterpart 9, a process seal 37 is preferably arranged. Since the electrical connection of the shield conductor 5 extends over the washer 13 and the securement apparatus 7 connected to the reference potential, at this position, no electrically conducting connection between, on the one hand, the container 1 and, respectively, the counterpart 9 connected to the container and, on the other hand, the shield conductor 5 is required.

The invention claimed is:

1. A fill level measuring device for capacitive fill level measurement and/or for travel time fill level measurement of a fill substance in a container, the fill level measuring device comprises:

a securement apparatus lying electrically at a reference potential and serving for securing the measuring device on a container opening equipped with a counterpart of said securement apparatus;

a washer of an electrically conductive material clamped in measurement operation between said securement apparatus and said counterpart;

an inner conductor, which is completely surrounded by an insulating layer, and which, in measurement operation, passes through said washer into the container;

an insulating body adjoining said insulating layer and coaxially surrounding said inner conductor;

a shield conductor, which coaxially surrounds said inner conductor and is connected mechanically and in an electrically conducting manner with said washer; and at least one electrical contact element affixed on a spring element in said washer outside of a region of such covered by said insulating body, wherein:

said insulating body has a washer-shaped section clamped between said securement apparatus and said washer; and said shield conductor is connected via said contact element and said washer to said securement apparatus in an electrically conducting manner.

2. The fill level measuring device as claimed in claim 1, wherein:

said insulating body has a hollow-cylindrical section, which is surrounded terminally by said washer-shaped section clamped between said securement apparatus and said washer, and which completely fills a hollow-cylindrical hollow space between said inner conductor and said washer at its side facing said securement apparatus.

3. The fill level measuring device as claimed in claim 1, wherein:

said insulating body includes a section conically tapering to an outer diameter of said insulated inner conductor in a direction away from said securement apparatus.

4. The fill level measuring device as claimed in claim 1, wherein:

each spring element is arranged in a blind bore provided in said washer; and each spring element presses its contact element against said securement element.

5. The fill level measuring device as claimed in claim 1, wherein:

said contact elements are metal spheres, which are affixed on their spring elements.

6. The fill level measuring device as claimed in claim 1, wherein:

said securement apparatus is connected to ground.

7. The fill level measuring device as claimed in claim 1, wherein:

said insulating body comprises polytetrafluoroethylene (PTFE).

8. The fill level measuring device as claimed in claim 1, wherein:

said shield conductor is screwed onto an electrically conductive, connection piece inserted into said washer.

9. The fill level measuring device as claimed in claim 8, wherein:

said connection piece is screwed flushly into said washer.

* * * * *